United States Patent
Holvey et al.

(10) Patent No.: US 11,286,058 B2
(45) Date of Patent: Mar. 29, 2022

(54) HELIPORT DOCKING SYSTEM

(71) Applicant: Textron Innovations Inc., Providence, RI (US)

(72) Inventors: Matthew Holvey, North Richland Hills, TX (US); Michael McNair, Weatherford, TX (US)

(73) Assignee: Textron Innovations Inc., Providence, RI (US)

( * ) Notice: Subject to any disclaimer, the term of this patent is extended or adjusted under 35 U.S.C. 154(b) by 441 days.

(21) Appl. No.: 16/223,653

(22) Filed: Dec. 18, 2018

(65) Prior Publication Data

US 2020/0189767 A1 Jun. 18, 2020

(51) Int. Cl.
*B64F 1/00* (2006.01)
*B64F 1/12* (2006.01)
*B64F 1/28* (2006.01)

(52) U.S. Cl.
CPC .............. *B64F 1/007* (2013.01); *B64F 1/125* (2013.01); *B64F 1/28* (2013.01)

(58) Field of Classification Search
CPC .. B64F 1/007; B64F 1/125; B64F 1/28; B64F 1/12; B64F 1/22
See application file for complete search history.

(56) References Cited

U.S. PATENT DOCUMENTS

| 3,761,040 | A | 9/1973 | Cummins |
| 4,397,254 | A | 8/1983 | Deady |
| 4,488,693 | A | 12/1984 | Brandt et al. |
| 4,529,152 | A | 7/1985 | Bernard |
| 4,834,321 | A | 5/1989 | Granger |
| 6,592,245 | B1 * | 7/2003 | Tribelsky ................ B64F 1/007 362/259 |

(Continued)

FOREIGN PATENT DOCUMENTS

| CA | 3060808 | A1 * | 1/2017 | .............. B64F 1/007 |
| CN | 105564663 | A | * | 5/2016 | |

(Continued)

OTHER PUBLICATIONS

European Search Report, EP 19212175.4, dated May 18, 2020, 4 pages.

*Primary Examiner* — Behrang Badii
*Assistant Examiner* — Jalal C Coduroglu
(74) *Attorney, Agent, or Firm* — Whitaker Chalk Swindle & Schwartz PLLC; Enrique Sanchez, Jr.

(57) ABSTRACT

A heliport docking system provides automated transport, fueling, maintenance, and logistical management of VTOLs. The heliport docking system can include a plurality of helipads that can be autonomously transported from area-to-area to assist in the logistics of heliport management and control. The helipad system can include a surface on which a VTOL can land and a controller that can perform functions related to routing, maintenance, object detection, and transport, among others. The helipad system can releasably secure the VTOL to the helipad and transport the VTOL to different areas of the heliport system. The helipad system can also fuel the VTOL by providing, electricity, combustible fuel, or other suitable energy source, and perform a maintenance check of the VTOL and create maintenance crew of any VTOL irregularities.

20 Claims, 5 Drawing Sheets

(56) References Cited

U.S. PATENT DOCUMENTS

| | | | |
|---|---|---|---|
| 6,845,516 B1* | 1/2005 | Letson | A41D 13/04 |
| | | | 2/51 |
| 7,152,547 B1* | 12/2006 | Hovland | B63B 17/00 |
| | | | 114/261 |
| 7,965,223 B1* | 6/2011 | McCusker | G08G 5/0078 |
| | | | 342/29 |
| 8,051,791 B2 | 11/2011 | Hovland et al. | |
| 8,616,497 B2* | 12/2013 | Ying | B64F 1/007 |
| | | | 244/114 R |
| 9,387,940 B2* | 7/2016 | Godzdanker | E01F 3/00 |
| 9,394,060 B2* | 7/2016 | Brody | E04H 6/44 |
| 9,403,559 B1 | 8/2016 | Hadley | B66D 1/12 |
| 9,415,869 B1* | 8/2016 | Chan | G05D 1/104 |
| 9,417,325 B1* | 8/2016 | Bry | G08G 5/0013 |
| 9,573,701 B2* | 2/2017 | Beardsley | B64C 39/024 |
| 9,711,851 B1* | 7/2017 | Cesarano | B64C 39/024 |
| 9,718,390 B1* | 8/2017 | Hadley | B60P 1/025 |
| 9,718,564 B1* | 8/2017 | Beckman | B64C 39/024 |
| 9,776,717 B2* | 10/2017 | Spinelli | B64F 1/222 |
| 9,849,981 B1* | 12/2017 | Burgess | G05D 1/0094 |
| 9,876,510 B2* | 1/2018 | Heldeis | H03M 11/003 |
| 10,042,359 B1* | 8/2018 | Konrardy | G06Q 10/1095 |
| 10,054,939 B1* | 8/2018 | Applewhite | B64C 39/024 |
| 10,139,820 B2* | 11/2018 | Liu | H04W 4/44 |
| 2006/0167596 A1* | 7/2006 | Bodin | G05D 1/0027 |
| | | | 701/3 |
| 2007/0228214 A1 | 10/2007 | Horak | |
| 2009/0152391 A1* | 6/2009 | McWhirk | B64B 1/02 |
| | | | 244/30 |
| 2011/0174925 A1* | 7/2011 | Ying | B64F 1/222 |
| | | | 244/114 R |
| 2014/0032034 A1* | 1/2014 | Raptopoulos | G05D 1/0088 |
| | | | 701/25 |
| 2016/0275801 A1* | 9/2016 | Kopardekar | G08G 5/0069 |
| 2017/0073084 A1* | 3/2017 | Mozer | B64F 1/24 |
| 2017/0096222 A1* | 4/2017 | Spinelli | B64C 27/08 |
| 2017/0158353 A1* | 6/2017 | Schmick | B60L 53/12 |
| 2017/0220037 A1* | 8/2017 | Berestov | G06K 9/0063 |
| 2017/0277176 A1* | 9/2017 | Hutson | G06F 3/011 |
| 2017/0291704 A1* | 10/2017 | Alegria | G05D 1/0866 |
| 2017/0313408 A1* | 11/2017 | Sheffer | B64D 43/02 |
| 2017/0316701 A1* | 11/2017 | Gil | G08G 5/0069 |
| 2017/0349280 A1* | 12/2017 | Liao | G05D 1/0033 |
| 2017/0350148 A1* | 12/2017 | King | B64F 1/368 |
| 2017/0355295 A1* | 12/2017 | Gutowitz | B60K 1/00 |
| 2018/0074519 A1* | 3/2018 | Qin | H04N 5/2252 |
| 2018/0111683 A1* | 4/2018 | Di Benedetto | G06Q 30/04 |
| 2018/0129962 A1* | 5/2018 | Mathew | G06Q 30/00 |
| 2018/0134412 A1* | 5/2018 | Poh | B64F 1/222 |
| 2018/0204111 A1* | 7/2018 | Zadeh | G06K 9/3233 |
| 2018/0242274 A1* | 8/2018 | Liu | G01S 5/02 |
| 2018/0249291 A1* | 8/2018 | Shamim | H04W 4/023 |
| 2018/0265295 A1* | 9/2018 | Beckman | G06Q 10/08345 |
| 2018/0265296 A1* | 9/2018 | Beckman | G06Q 10/083 |
| 2018/0301045 A1* | 10/2018 | Pesik | G06T 7/73 |
| 2018/0320402 A1* | 11/2018 | Evans | B60L 53/14 |
| 2018/0327092 A1* | 11/2018 | Deng | B64C 39/024 |
| 2018/0354650 A1* | 12/2018 | Tan | E01D 18/00 |
| 2018/0372834 A1* | 12/2018 | Shoshan | G01S 5/0252 |
| 2019/0096270 A1* | 3/2019 | Wang | G08G 5/025 |

FOREIGN PATENT DOCUMENTS

| | | | | |
|---|---|---|---|---|
| DE | 4225413 C1 | * | 3/1994 | G01S 13/9019 |
| GB | 2071031 B | | 2/1984 | |
| JP | 2016033807 A | * | 3/2016 | G01S 5/0072 |
| KR | 20120061775 A | * | 6/2012 | B64F 1/22 |
| KR | 20160093580 A | * | 8/2016 | |
| RU | 2550887 C2 | * | 5/2015 | |
| RU | 2620400 C2 | * | 5/2017 | A62C 5/022 |
| WO | 1990013480 A1 | | 11/1990 | |
| WO | 1993017910 A1 | | 9/1993 | |
| WO | 2008016311 A2 | | 2/2008 | |
| WO | WO-2008016311 A2 | * | 2/2008 | B60B 19/125 |
| WO | WO-2008115170 A1 | * | 9/2008 | B64F 1/305 |
| WO | WO-2010145637 A1 | * | 12/2010 | B64F 1/007 |
| WO | 2011137529 A1 | | 11/2011 | |
| WO | WO-2011137529 A1 | * | 11/2011 | B64F 1/22 |
| WO | WO-2012063220 A2 | * | 5/2012 | B64C 27/04 |
| WO | 2015032665 A1 | | 3/2015 | |
| WO | WO-2015032665 A1 | * | 3/2015 | B64F 1/125 |
| WO | WO-2016105650 A1 | * | 6/2016 | B64C 9/02 |
| WO | WO-2017046699 A1 | * | 3/2017 | G01S 19/48 |
| WO | WO-2017130181 A1 | * | 8/2017 | B64F 1/0299 |
| WO | WO-2017194069 A1 | * | 11/2017 | B64F 1/22 |
| WO | WO-2017197524 A1 | * | 11/2017 | G01P 21/025 |
| WO | WO-2018015960 A1 | * | 1/2018 | B60L 53/36 |
| WO | WO-2018034615 A1 | * | 2/2018 | B64F 1/30 |
| WO | WO-2018042238 A1 | * | 3/2018 | B64F 1/125 |
| WO | WO-2018169695 A1 | * | 9/2018 | G06Q 10/08 |
| WO | WO-2019055685 A1 | * | 3/2019 | B64C 39/02 |

* cited by examiner

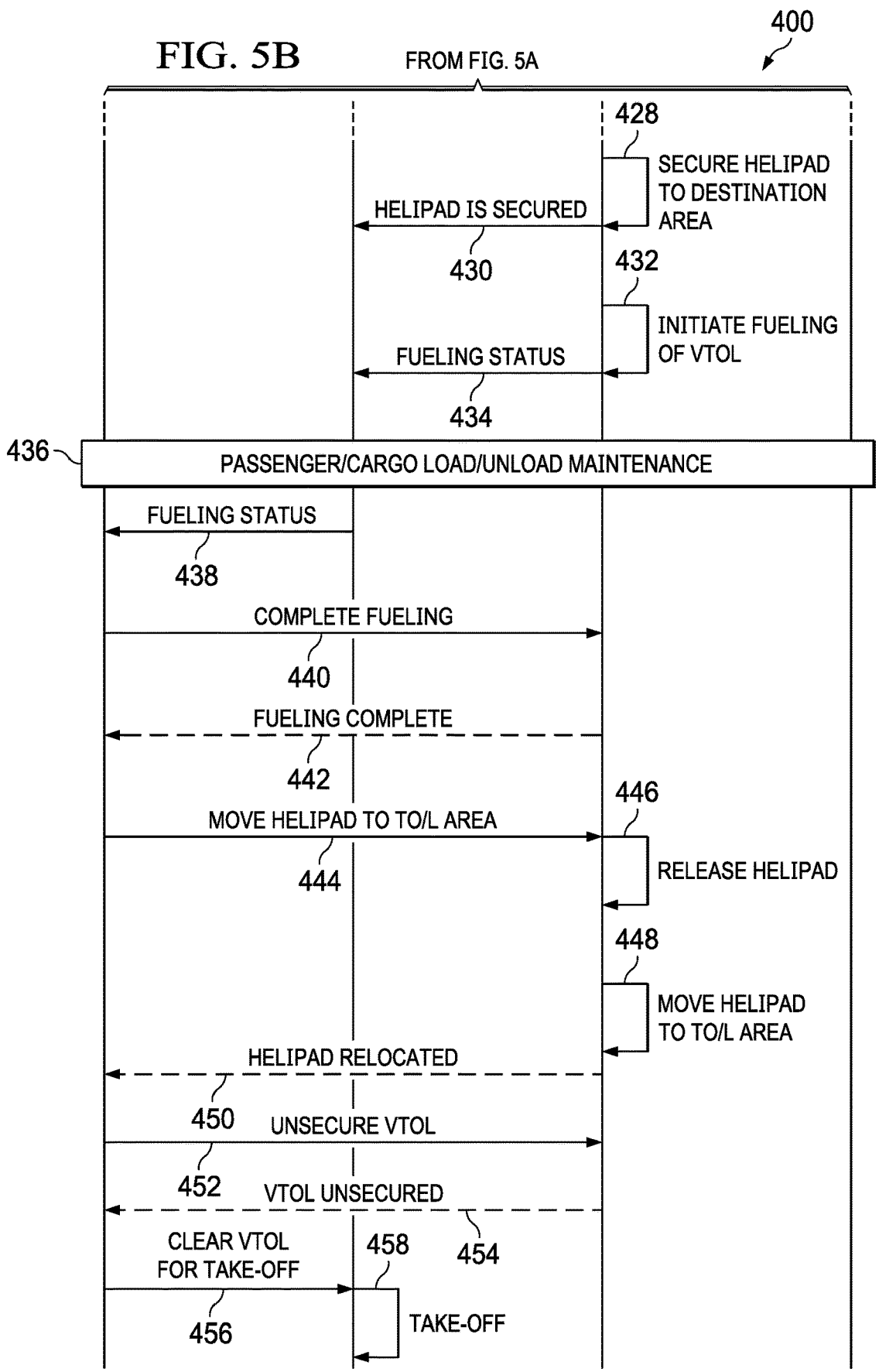

HELIPORT DOCKING SYSTEM

BACKGROUND

1. Field of the Invention

The present disclosure is generally related to heliports adapted to provide take-off and landing areas for vertical take-off and landing aircraft (VTOL), and more specifically to a heliport including an autonomous VTOL helipad system for the fueling and transport of idle VTOLs.

2. Background of the Invention and Description of Related Art

A heliport is well known as an airport or landing place for helicopters. Traditional heliports provide designated landing areas for the take-off and landing of rotorcraft. These landing areas are typically stationary surfaces that are part of a larger structure. These heliports include infrastructure proximate the landing area, such as landing areas with gates where helicopters can "park" so that passengers can deplane and cargo can be removed, as well as docking apparatus that facilitate service vehicles that engage the parked helicopter in-place to refuel and service the aircraft. During the time between helicopter take-off and landing, an occupied landing area in the heliport cannot be used by other helicopters, thereby limiting the number of helicopters that can be accommodated. In other instances, heliports can include large airfields so that landing areas are more plentiful, however these airfields require additional vehicles to transport passengers and cargo to distant locations, adding additional wait time to the process. The additional service and transport vehicles expend additional fuel in reaching their destination.

SUMMARY

The present disclosure teaches technical advantages as a heliport docking system including automated transport, fueling, maintenance, and logistical management of VTOLs. The heliport docking system can include a plurality of helipads that can be autonomously transported from area-to-area to assist in the logistics of heliport management and control. The helipad system can include a surface on which a VTOL can land and a controller that can perform functions related to routing, maintenance, object detection, and transport, among others. The helipad system can releasably secure the VTOL to the helipad and transport the VTOL to different areas of the heliport system. The helipad system can fuel the VTOL by providing, electricity, combustible fuel, or other suitable energy source, and perform a maintenance check of the VTOL and create maintenance crew of any VTOL irregularities. Although the preferred embodiment discloses a VTOL, any type of aircraft can utilize the heliport docking system.

A central heliport management system can oversee the logistics and operation of a plurality of helipad systems. The heliport management system can be communicatively linked with one or more helipad systems via wired or wireless communication protocols, including the helipad controller. The heliport management system preferably includes one or more servers that can include waypoint and navigation algorithms. The heliport management system can assign an aircraft to a specific helipad system, identifying the specific information of the aircraft, including the dimensions and weight of the aircraft, whether the aircraft includes any passengers, the system status of the aircraft, the fuel level of the aircraft, the flight itinerary and schedule of the aircraft, and any cargo held by the aircraft, among other types of aircraft information. The heliport management system can also identify location and status of a particular helipad system, including GPS coordinates, fuel level, and time to arrival, among other types of helipad system information.

Accordingly, one embodiment of the present disclosure includes a heliport docking system, comprising: a helipad, including a VTOL fueling mechanism configured to provide a VTOL with an energy source, and a VTOL maintenance device configured to obtain maintenance data from the VTOL; a helipad controller operably coupled to the helipad, including a helipad routing module adapted to determine a destination of the helipad and a route to the destination, a VTOL maintenance module adapted to receive the maintenance data from the VTOL maintenance device and generate an alert based upon the maintenance data, and a VTOL fueling module configured to control the amount of fuel delivered to the VTOL aircraft by the fueling mechanism; and a transport mechanism operably coupled to the helipad and the helipad controller and configured to transport the VTOL to the destination along the route. The helipad can further include a VTOL sensor configured to detect the presence of the VTOL proximate the helipad, a VTOL securing device configured to secure the VTOL to the helipad, and an obstacle sensor configured to detect objects proximate the helipad. The helipad controller can further include a VTOL securing module adapted to control the VTOL securing device.

Another embodiment of this disclosure includes a method for operating a heliport system, comprising: receiving a request from an aircraft to land at a heliport; requesting transport of a helipad to a landing area to receive the aircraft; securing the aircraft to the helipad after landing; and transporting the helipad with the secured aircraft to a destination area; fueling the aircraft during transport; receiving maintenance data from the aircraft during transport; and unloading the aircraft upon arrival at the destination area. The aircraft can be a VTOL, rotorcraft, airplane, drone, or other aircraft. The helipad can be transported along a chain track disposed in the ground, towed, self-propelled, or transported via other suitable mechanism. The fueling of the aircraft includes supplying the aircraft with fuel to power a combustion engine of the aircraft, supplying the aircraft with electricity to power an electric engine of the aircraft via a static electrical connection between the helipad and the aircraft, supplying the aircraft with electricity to power an electric engine of the aircraft via an inductive charge from the helipad to the aircraft, or other suitable energy source provision. The method can further comprise scanning for obstacles while transporting the helipad from the landing area to the destination area via a sensor on the helipad.

Another embodiment of this disclosure includes a method for automated helipad transport, comprising: securing an aircraft to a helipad via a securing device; determining a destination area for the helipad based upon the contents of the aircraft; determining a route for the helipad to travel to the destination area; autonomously transporting the helipad along the route to the destination area; sensing an obstacle blocking the route via a sensor; avoiding the obstacle; and continuing transport of the helipad along the route to the destination area. The securing device can be mechanical, electrical, magnetic, or other suitable restraint. The securing device can also be pressure-sensitive. The method can further comprise identifying the dimensions and weight of the aircraft. The sensor can emit and detect ultrasonic, acoustic, LIDAR, or RADAR signals.

DETAILED DESCRIPTION

The preferred version of the inventions presented in the following written description and the various features and advantageous details thereof are explained more fully with reference to the non-limiting examples included in the accompanying drawings and as detailed in the description, which follows. Descriptions of well-known components have been omitted so to not unnecessarily obscure the principle features of the invention as described herein. The examples used in the following description are intended to facilitate an understanding of the ways in which the invention can be practiced and to further enable those skilled in the art to practice the invention. Accordingly, these examples should not be construed as limiting the scope of the claimed invention.

Figure 1:
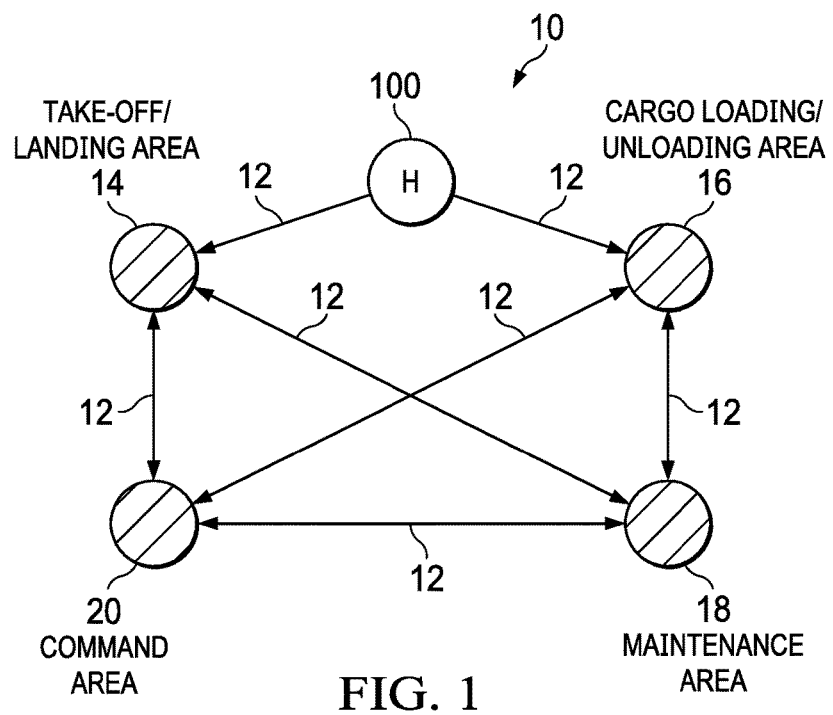
FIG. 1 is a schematic view of a heliport docking system, in accordance with an embodiment of the present disclosure.

FIG. 1 is a schematic view of a heliport system, generally designated as 10, in accordance with an embodiment of the present disclosure. In the heliport system 10, a helipad system 100 can be transported between a number of different areas, such as a take-off and landing area 14, a loading and unloading area 16, and a maintenance area 18, and a command area 20, along a route 12. The route can be followed via a transport mechanism, such as a chain, track, tug, rail, or other mechanism. Other areas can include, cleaning areas and restocking areas, amongst others. Routes 12 can be created between each area to avoid wasted resources in transporting a vehicle to all areas. Alternatively, a route can be specified between a subset of predetermined areas most commonly used. In one embodiment, the route 12 on which the helipad system travels can be a track with which the helipad system 100 can interact. In another embodiment, the route 12 can be a flat surface on which the helipad system 100 can drive itself or on which it can be towed by another vehicle. Obstacle sensors help guide the helipad system 100 along the route. The obstacle sensors can emit and detect ultrasonic, acoustic, LIDAR, or RADAR signals, and can include other active and passive mechanisms for obstacle detection.

The heliport system 10 allows aircraft to land in one area, have its contents removed or replaced in another area, and be maintenanced in yet another area. In this way, aircraft can be cycled-off of a transport schedule to allow for cleaning, repair, restocking of supplies, or decommissioning. Advantageously, resources required for specific functions, such as passenger service, cargo management, and maintenance can be grouped in predetermined areas minimizing the need to replicate resources at disparate areas.

The helipad system 100 can accommodate the takeoff and landing of aircraft. The aircraft is preferably a vertical take-off and landing aircraft (VTOL), but can be a helicopter, airplane, drone, or other aircraft. Once the aircraft has landed on the helipad 100, the helipad 100 can secure the aircraft to the helipad 100 and transport the aircraft between the different areas 14, 16, and 18 of the system 10. In the preferred embodiment, the helipad system 100 can fuel the aircraft that it is transporting and perform a maintenance check as the helipad system 100 moves along the route 12. Alternatively, the helipad system 100 can fuel the aircraft that it is transporting and perform a maintenance check while the aircraft is parked on the helipad system 100.

In one exemplary embodiment, the take-off and landing area 14 can be an area in which the aircraft takes-off from and lands on the helipad system 100. This area 14 can also serve as an area in which passengers of the aircraft can get board and de-plane the aircraft. Once the aircraft lands on the helipad system 100 at the landing area 14, the helipad system 100 can secure the aircraft to the helipad system 100. Additionally, the helipad system 100 can initiate fueling the aircraft and performing a maintenance check of the aircraft at the landing area 14. The helipad system 100 can then determine the next area to which the aircraft should be transported.

In another exemplary embodiment, after passengers have boarded or de-planed the helipad system 100, the helipad system 100 can determine whether the aircraft next needs to go to the cargo loading and unloading area 16. Alternatively, the heliport management system 102 can determine whether the aircraft next needs to go to the cargo loading and unloading area 16 and can communicate the destinations area to the helipad system 100. The helipad system 100 can determine the best route 12 transport the aircraft to the cargo loading and unloading area 16. Alternatively, the heliport management system 102 can determine the best route 12 to take to transport the aircraft to the cargo loading and unloading area 16 and communicate the destination area route to the helipad system 100. The best route 12 can be determined by taking into account distance, traffic congestion, obstacle detection, and speed of the helipad system 100, among other factors. At the cargo loading and unloading area 16, any cargo carried by the aircraft can be unloaded, and any cargo can be loaded on to the aircraft that it needs to carry for its next flight. The helipad system 100 can then determine the next destination area that the aircraft needs to be taken to.

In another exemplary embodiment, after conducting a maintenance check initiated by the helipad system 100, the helipad system 100 can determine whether the aircraft requires maintenance to be performed prior to taking-off for its next flight. Accordingly, the helipad system 100 can determine that the aircraft next needs to go to the maintenance area 18. At the maintenance area, required maintenance for the aircraft, as indicated by the maintenance check performed by the helipad system 100, can be performed on the aircraft. Once it is determined by the helipad system 100 that the aircraft needs to go to the maintenance area 18, the helipad system can select the proper route 12 to get to the area 18. The helipad system 100 can then determine the next area that the aircraft needs to be taken to.

In another exemplary embodiment, after receiving maintenance at the maintenance area 18, the aircraft can then be delivered back to the take-off area 14. Once the helipad system 100 has determined that the aircraft needs to be delivered to the take-off area 14, the helipad system 100 or the heliport management system 102 can determine the best route 12 to the take-off area 14. Once at the take-off area 14, the passengers needing to board the aircraft for the next flight can board the aircraft. Once the aircraft is ready for take-off, the heliport management system 102 can direct the helipad system 100 to release the aircraft so that the aircraft can take-off from the helipad system 100. A route 12 can be connected between each destination area, so that the shortest route can be determined by the heliport management system 102 or the helipad system 100. Alternatively, a circuitous route can connect each destination area sequentially.

Figure 2:
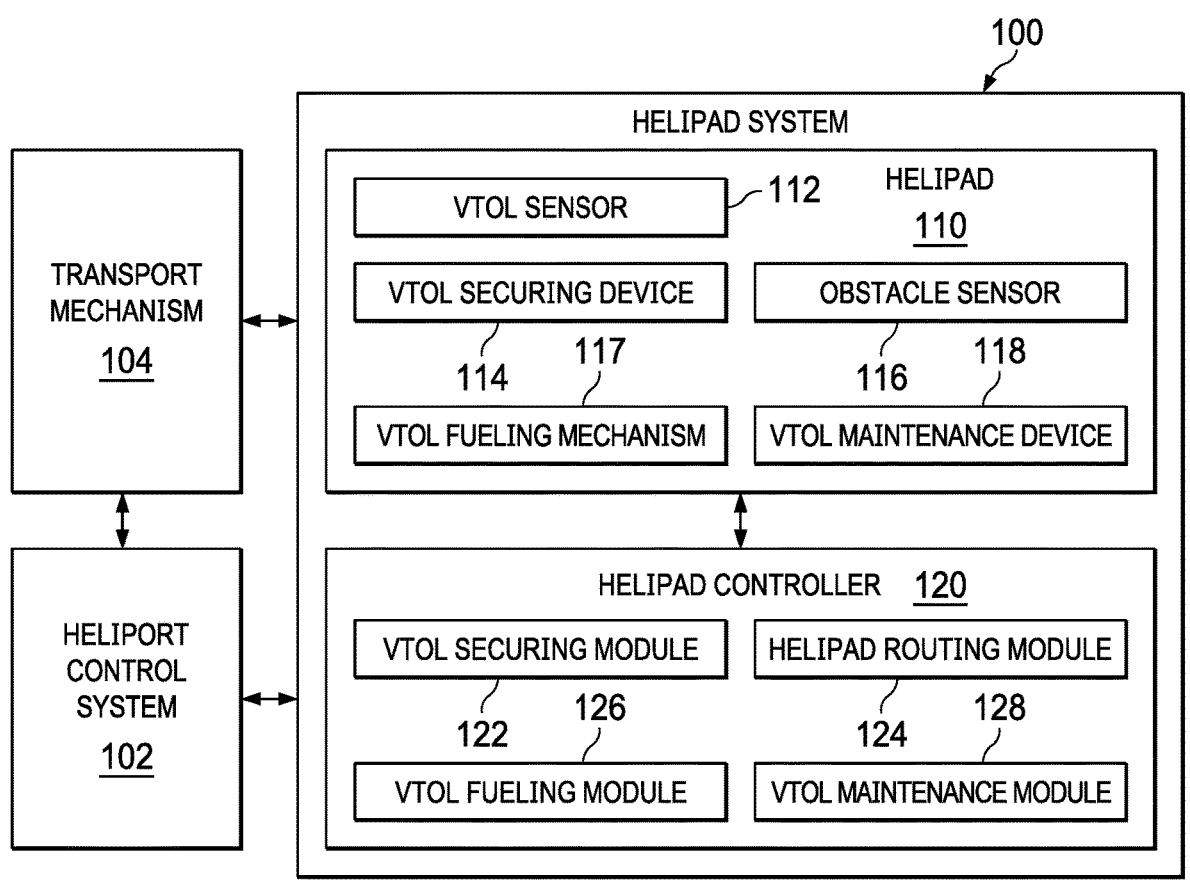
FIG. 2 is a schematic view of a helipad system, in accordance with an embodiment of the present disclosure.
Figure 3:
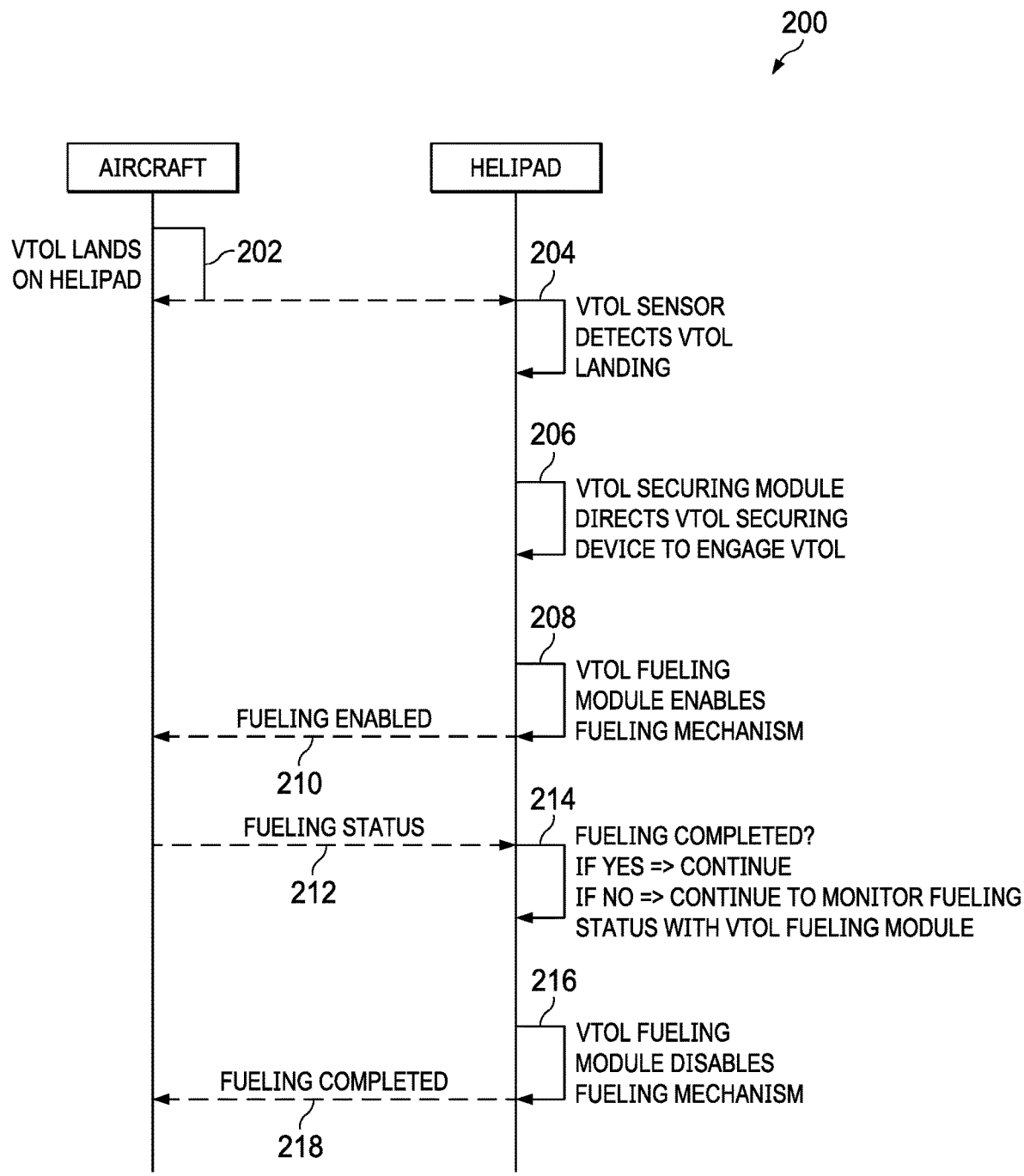
FIG. 3 is a flowchart of a method of securing and fueling an aircraft via a helipad, in accordance with an embodiment of the present disclosure.

Referring to FIG. 2, there is shown a block diagram of the heliport docking system, in accordance with one embodiment of the present disclosure. The heliport docking system can include a helipad system 100, a heliport management system 102, and a transport mechanism 104. The helipad system 100, can include a helipad 110 and a helipad controller 120. The helipad 110 can include a VTOL sensor 112, a VTOL securing device 114, an obstacle sensor 116, a VTOL fueling mechanism 117, and a VTOL maintenance device 118. The helipad controller 120 can include a VTOL securing module 122, helipad routing module 124, VTOL fueling module 126, and VTOL maintenance module 128.

The helipad system 100 can also include a helipad 110. The helipad 110 can include a surface on which a VTOL, or other type of aircraft can land, park, be transported, and take-off. In a preferred embodiment, helipad 110 can have a VTOL sensor 112 that can retrieve data regarding the presence of a VTOL on the helipad 110. In one embodiment the sensor 112 can be a pressure sensor. The VTOL sensor 112 can be an optical sensor, a LIDAR sensor, a RADAR sensor, an acoustic sensor, an ultrasonic sensor, or other suitable sensor.

The helipad 110 can also include a VTOL securing device 114. The VTOL securing device 114 can engage the VTOL (or other aircraft), such that the aircraft can be secured to the helipad 110 once the VTOL has landed on the helipad 110. In one embodiment, the securing device 114 can be a clamping device that clamps the skids or wheels of the VTOL to the helipad 110. The securing device 114 can be mechanical, magnetic, or some other suitable retention system. The VTOL securing device 114 can include one or more connectors that can operably engage the aircraft to receive data related to the aircraft. Alternatively, a wireless device can be disposed on the helipad system 100 to receive data related to the aircraft.

The helipad 110 can also include an obstacle sensor 116. The obstacle sensor 116 can retrieve data regarding the presence and location of obstacles along the route 12 on which the helipad system 100 is moving. In one embodiment the obstacle sensor 116 is a light sensor, such as a LIDAR sensor. In another embodiment the obstacle sensor 116 can be a RADAR sensor.

The helipad 110 can also include a VTOL fueling mechanism 117. The VTOL fueling mechanism 117 can provide fuel to the VTOL. In one embodiment, the fueling mechanism 117 can provide fuel to the VTOL to power a combustion engine of the VTOL. In this embodiment the fueling mechanism 117 can comprise a fuel tank for storing the fuel and a pump and hose to deliver the fuel from the tank to the VTOL. In another embodiment, the fueling mechanism 117 can provide electricity to power an electric engine of the VTOL. In this embodiment the fueling mechanism 117 can deliver electricity to the VTOL through a static electrical connection between the fueling mechanism 117 and the VTOL. In another embodiment the fueling mechanism 117 can deliver electricity to the VTOL through an inductive charge. In the embodiments where the fueling mechanism 17 supplies electricity to the VTOL, the fueling mechanism can include a battery that stores the electricity that it supplies to the VTOL. In the embodiments where the fueling mechanism 17 supplies electricity to the VTOL, the fueling mechanism can create the electricity that it supplies to the VTOL using a generator.

The helipad 110 can include a VTOL maintenance device 118. The maintenance device 118 can detect data regarding the needed maintenance of the VTOL. In one embodiment, the maintenance device 118 can physically connect to the VTOL to retrieve the data regarding maintenance being output by the VTOL. In another embodiment, the maintenance device 118 can wirelessly connect to the VTOL to retrieve the data regarding maintenance being output by the VTOL. Such a wireless connection can include a Bluetooth connection, a WiFi connection, or any other wireless connection by which data can be transmitted.

The helipad system 100 can comprise a helipad controller 120. The helipad controller 120 can be configured to control the operation of the helipad 110. The helipad controller can include a VTOL securing module 122, a helipad routing module 124, a VTOL fueling module 126, and a VTOL maintenance module 128. In one embodiment the controller 120 can control the modules 122, 124, 126, 128 based on the data collected by or the actions performed by the different sensors 112, 116, devices 114, 118, and mechanisms 115, 117 of the helipad 110. In one embodiment the controller 120 can receive input data from an outside source that directs the controller 120 on the next action the helipad 110 needs to take. For example, in this embodiment the controller can receive input data from a flight control tower of the heliport system 10. In another embodiment the controller 120 can receive input data from an operator of the helipad system 100.

In one embodiment, the VTOL securing module 122 can retrieve the data obtained by the VTOL sensor 112. If the data obtained by the VTOL sensor 112 indicates that a VTOL is present on the helipad 110, the securing module 122 can engage the VTOL securing device 114 to secure the VTOL to the helipad 110. The VTOL securing device 114 can be controlled by the VTOL securing module 122 or the heliport management system 102. In one embodiment the helipad controller 120 can give direction to the VTOL securing module 122 on whether the VTOL securing device 114 should be engaged or disengaged based on the input data received by the helipad controller 120. The VTOL securing module 122 can include mechanical, magnetic, or other suitable securing mechanism.

In one embodiment, the helipad routing module 124 can control the transport mechanism 115. The routing module 124 can determine which area of the heliport system 10 the helipad system 100 needs to be delivered to. The routing module 124 can determine the appropriate route 12 for the helipad system 100 to take to get to the desired area. The routing module 124 can control the transport mechanism 115 such that the helipad system travels along the desired route 12 to the desired area of the heliport system 10. In another embodiment, the heliport management system 102 can control the transport mechanism 115. The heliport management system 102 can determine which area of the heliport system 10 the helipad system 100 needs to be delivered to. The heliport management system 102 can determine the appropriate route 12 for the helipad system 100 to take to get to the desired area. The heliport management system 102 can control the transport mechanism 115 such that the helipad system travels along the desired route 12 to the desired area of the heliport system 10. In one embodiment, the routing module 124 can retrieve the data from the obstacle sensor 116. In another embodiment, the routing module 124 can retrieve the data from the obstacle sensor 116 and forward the data to the heliport system 10. The routing module 124 can use the data from the obstacle sensor 116 to determine if there is an obstacle on the route 12, and redirect the helipad system 100 to avoid the obstacle such that the helipad system still reaches the desired area. In one embodiment, the routing module 124 can retrieve input from the helipad controller 120 or from the VTOL maintenance module 128 indicating the VTOL on the helipad system requires maintenance, and the routing module can determine that the helipad system needs to travel to the maintenance area 18 of the heliport system 10. In one embodiment the controller 120 can inform the routing module 123 of a destination area of the heliport system 10 based on the input data received by the controller.

In one embodiment the VTOL fueling model 126 can control the fuel delivered to the VTOL by the VTOL fueling mechanism 117. The fueling module 126 can determine the fuel level of the VTOL and either continue supplying fuel to the VTOL fueling mechanism 117 or stop fueling the VTOL via the fueling mechanism. In one embodiment the fueling module 126 is controlled by the controller 120 based on the input data received by the controller.

In one embodiment the VTOL maintenance module 128 can receive the data obtained by the VTOL maintenance device 118 and determine whether the VTOL needs a maintenance activity performed. Maintenance activities can include oil change, propeller replacement, light outage, low battery, or other relevant conditions. In one embodiment, after the maintenance module 128 determines that the VTOL requires maintenance, the maintenance module 128 can communicate the need for maintenance to the helipad controller 120, which can then direct the helipad routing module 124 to route the helipad system 100 to a maintenance area 18 of the heliport system 10. In one embodiment the VTOL maintenance device 128 is controlled by the controller 120 based on the input data received by the controller. In another embodiment, the VTOL maintenance device 128 can be controlled by the heliport management system 102.

The helipad controller 120, the VTOL securing module 122, the helipad routing module 124, the VTOL fueling module 126, the VTOL maintenance module 128, and the heliport management system 102 can be implemented on one or more servers, having one or more processors, with access to electronic storage. Server(s) can include electronic storage, one or more processors, and/or other components. Server(s) can also include field programmable gate arrays (FPGAs), application specific integrated circuits (ASICs), and/or other dedicated components. Server(s) can include communication lines, or ports to enable the exchange of information with a network and/or other computing platforms. Server(s) can include a plurality of hardware, software, and/or firmware components operating together to provide the functionality attributed herein to server(s). For example, server(s) can also be implemented by a cloud of networked computing platforms operating together as a server(s).

Electronic storage can include non-transitory storage media that electronically stores information. The electronic storage media of electronic storage can include one or both of system storage that is provided integrally (i.e., substantially non-removable) with server(s) and/or removable storage that is removably connectable to server(s) via, for example, a port (e.g., a USB port, a firewire port, etc.) or a drive (e.g., a disk drive, etc.). Electronic storage can include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage can include one or more virtual storage resources (e.g., cloud storage, a virtual private network, and/or other virtual storage resources). Electronic storage can store software algorithms, information determined by processor(s), information received from server(s), information received from computing platform(s), and/or other information that enables server(s) to function as described herein.

Processor(s) can be configured to provide information processing capabilities in server(s). As such, processor(s) can include one or more of a digital processor, an analog processor, a digital circuit designed to process information, an analog circuit designed to process information, a state machine, and/or other mechanisms for electronically processing information. Although processor(s) as a single entity, this is for illustrative purposes only. In some implementations, processor(s) can include a plurality of processing units. These processing units can be physically located within the same device, or processor(s) can represent processing functionality of a plurality of devices operating in coordination.

Processor(s) can be configured to execute machine-readable instruction modules by software, hardware, firmware, some combination of software, hardware, and/or firmware, and/or other mechanisms for configuring processing capabilities on processor(s). As used herein, the term "machine-readable instruction component" can refer to any component or set of components that perform the functionality attributed to the machine-readable instruction component. This can include one or more physical processors during execution of processor readable instructions, the processor readable instructions, circuitry, hardware, storage media, or any other components.

The heliport docking system 10 can also include a transportation mechanism 104. The transportation mechanism 104 can move the helipad system 102 different areas of the heliport docking system 10. In one embodiment, the routes 12 of the heliport docking system 10 can be tracks. The transportation mechanism 115 can include one or more track wheels configured to engage the route 12 tracks. In another embodiment, the routes 12 of the heliport system 10 can include a flat surface. The transportation mechanism 115 can include one or more wheels configured to roll over the flat surface. The transportation mechanism 115 can also include an engine and drivetrain system to power the movement of the helipad 110. The transportation mechanism 115 is preferably autonomous, not requiring any user input. However, the transportation mechanism 115 can be manually operated, manually overridden, or otherwise operated. In another embodiment, Referring now to FIG. 2, there is shown a flow chart exemplifying control logic embodying features of a method for securing and fueling the VTOL via the helipad. The control logic can be implemented as an algorithm on a server, general-purpose computing platform or other suitable microprocessor-based system alone, or together with described components, devices, or systems. The control logic can leverage the ability of a computer platform to spawn multiple processes and threads by processing data simultaneously. The speed and efficiency of the control logic can be greatly improved by instantiating more than one process execute the method. However, one skilled in the art of programming will appreciate that use of a single processing thread may also be utilized and is within the scope of the present invention. The method begins at 202 where the VTOL lands on the helipad 110. The method then proceeds to 204.

At 204, the VTOL sensor 112 detects that the VTOL has landed on the helipad 110. In one embodiment, the sensor can transmit a signal and determine that an aircraft is present by receiving a reflection of a signal. In another embodiment, the sensor can come into contact with a portion of the aircraft and thereby determine that the aircraft is present. The method then proceeds to 206.

At 206, the VTOL securing module 122 directs the VTOL securing device 114 to engage the VTOL. In one embodiment, the VTOL securing module 122 can retrieve the data obtained by the VTOL sensor 112. If the data obtained by the VTOL sensor 112 indicates that a VTOL is present on the helipad 110, the securing module 122 can engage the VTOL securing device 114 to secure the VTOL to the helipad 110. The VTOL securing device 114 can be controlled by the VTOL securing module 122 or the heliport management system 102. In one embodiment the helipad controller 120 can give direction to the VTOL securing module 122 on whether the VTOL securing device 114 should be engaged or disengaged based on the input data received by the helipad controller 120. The VTOL securing module 122 can include mechanical, magnetic, or other suitable securing mechanism. The method then proceeds to step 208.

At 208, the VTOL fueling module 126 enables the fueling mechanism 117. In one exemplary embodiment, the VTOL fueling module 126 can control an actuator operably coupled to the fueling mechanism 117. In another exemplary embodiment, the VTOL fueling module 126 can engage in inductive charger operably coupled to the fueling mechanism 117. The method then proceeds to step 210.

At 210, the VTOL fueling mechanism 117 begins supplying fuel to the VTOL. The step then proceeds to 212.

At 212, the VTOL sends a fueling status that is received by the VTOL fueling module 117. The method then proceeds to 214.

At 214 the fueling module 126 determines if the fuel level of the VTOL is sufficiently full. If it is not, the method goes back to step 212. If the VTOL is sufficiently full of fuel the method continues to step 216.

At 216 the fueling module 126 disables the fueling mechanism 117 from the VTOL. The method then proceeds to step 218.

At step 218 the fueling of the VTOL is complete.

Figure 4:
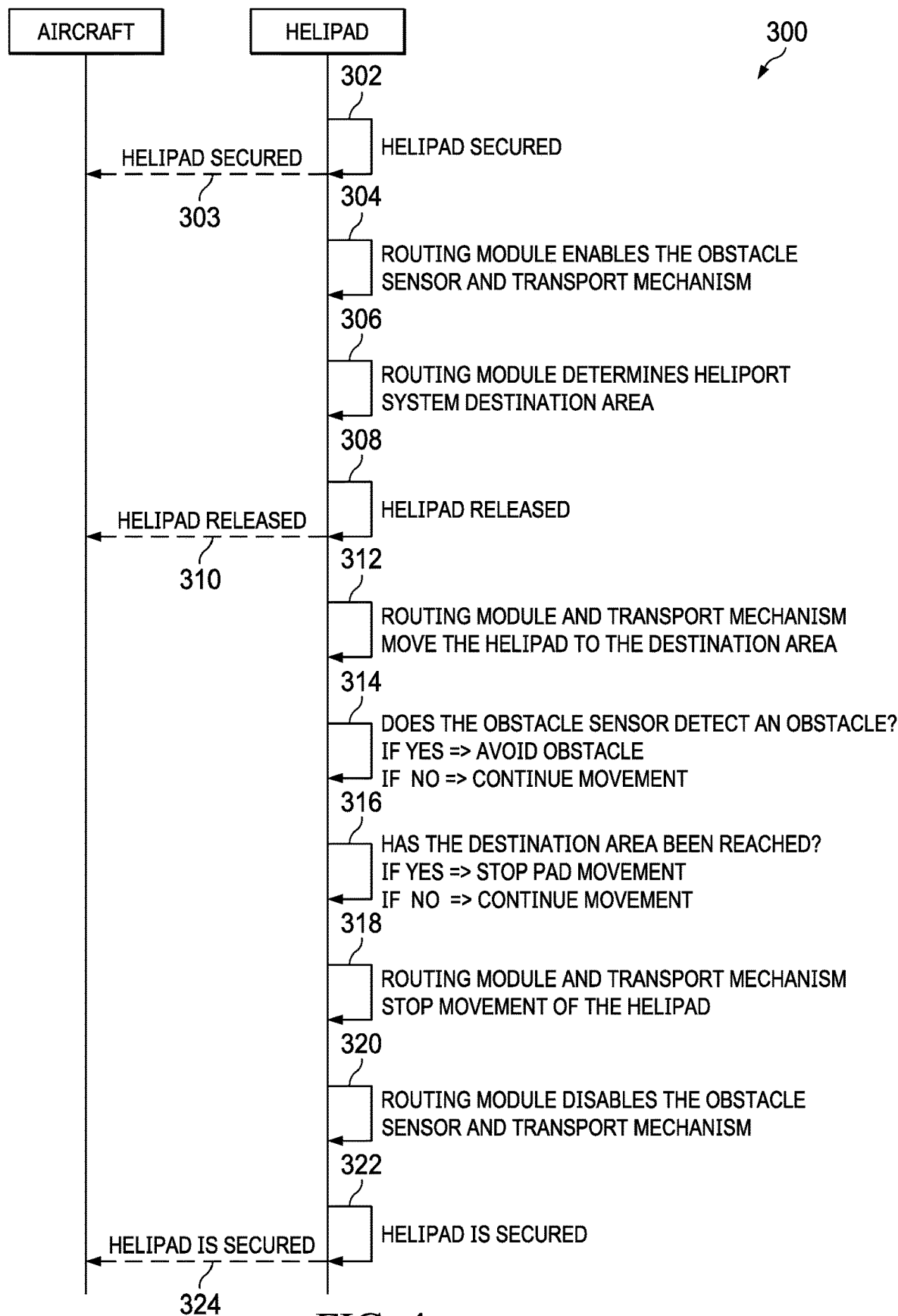
FIG. 4 is a flowchart of a method of transporting a helipad within a heliport system, in accordance with an embodiment of the present disclosure; and A flowchart of a method for the operation of a heliport system, in accordance with an embodiment of the present disclosure, is shown in FIGS. 5A and 5B.

FIG. 4 is a flowchart of a method 300 of moving a helipad system 100 from a current area of a heliport system 10 to a destination area of the heliport system. The method begins at 302, where the helipad system is secured to an area of the heliport system 10. The method then proceeds to 303.

At 303, the helipad system 100 communicates to the VTOL that the helipad is secured to an area of the heliport system. The method then proceeds to 304.

At 304, the helipad routing module 124 enables the functionality of the obstacle sensor 116 and the transport mechanism 115. The method then proceeds to 306.

At 306, the routing module 124 determines the destination area that the helipad system 100 needs to move to within the heliport area 10. The method then proceeds to 308.

At 308, the helipad system 100 is released from the current area of the transport system 10. The method then proceeds to 310.

At 310 the helipad system 100 communicates to the VTOL that the helipad system 100 has been released from the current area. The method then proceeds to step 312.

At 312 the routing module 124 and transportation mechanism 115 begin to move the helipad system 100 to the destination area of the heliport system 10. The method then proceeds to 314.

At 314 the obstacle sensor 116 and routing module 124 determine if the helipad system 100 has encountered an obstacle along the route to the destination area. If an obstacle is determined that an obstacle has been encountered, the routing module 124 and transport mechanism 115 move the helipad system 100 to avoid the obstacle. If no obstacle is encountered the method proceeds to 316.

At 316 the routing module 124 determines if the helipad system 100 has reached the destination area. If the destination area has not been reached the helipad system 100 continues in movement. If the destination area has been reached then the method proceeds to 318.

At 318 the routing module 124 and transport mechanism 115 stop movement of the helipad system 100. The method then proceeds to 320.

At 320 the routing module 124 disables the functionality of the obstacle sensor 116 and the transport mechanism 115. The method then proceeds to 322.

At 322 the helipad system 100 is secured to the destination area. The method then proceeds to 324.

At 324 the helipad system 100 communicates to the VTOL that the helipad system is secured to the destination area.

Figure 5A:
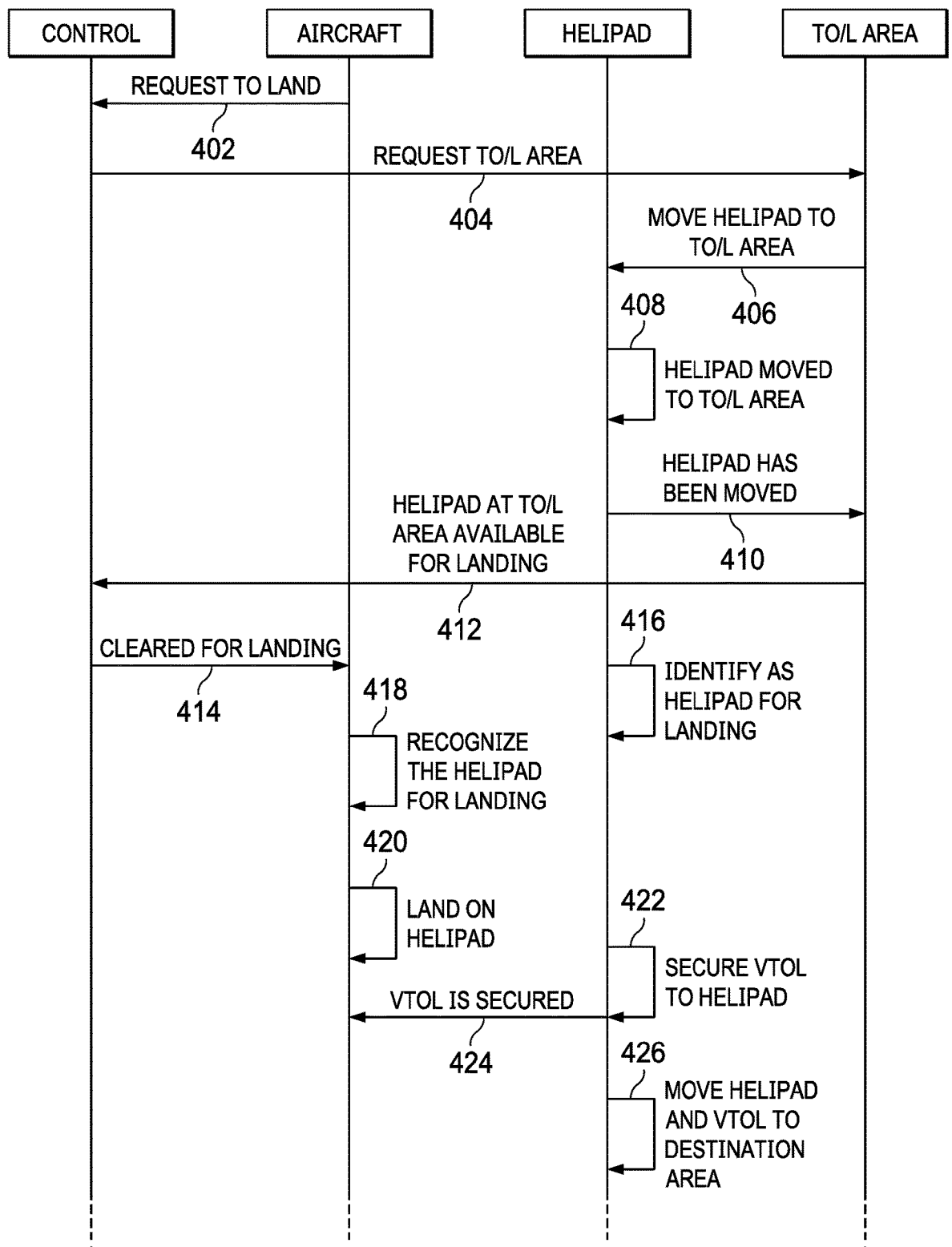

A flowchart of a method 400 for the operation of a heliport system 10, is broken up between FIGS. 5A and 5B, due to size. Referring to FIG. 5A, the method 400 begins at 402 where a VTOL sends a request to a controller to land. In one embodiment of this method 400, the controller can be the helipad controller 120. In other embodiments the controller of this method can be a controller common to the entire heliport system 10. In such an embodiment the controller can be an air traffic control tower. The method then proceeds to 404.

At 404 the controller sends a request for the VTOL to land to the take-off and landing area (TO/L area) 14. The method then proceeds to 406

At 406 the TO/L area sends a message to the helipad system 100 to move the helipad to the TO/L area. The method then proceeds to 408.

At 408 the helipad is moved to the TO/L area. The method then proceeds to 410.

At 410 the helipad sends a message to the TO/L area indicating that the helipad is at the TO/L area. The method proceeds to 412

At 412 the TO/L area sends a message to the controller saying that the helipad is at the TO/L area. The method then proceeds to 414.

At 414 the controller sends a message to the VTOL saying that the VTOL is cleared for landing. The method then proceeds to 416.

At 416 the helipad identifies itself as the helipad intended for landing. The method then proceeds to 418.

At 418 the VTOL recognizes the helipad intended for landing. The method then proceeds to 420.

At 420 the VTOL lands on the helipad. The method then proceeds to 422.

At 422 the helipad secures the VTOL to the helipad. In one embodiment the VTOL can be secured to the helipad with the VTOL securing device 114 and the VTOL securing module 122. The method then proceeds to 424.

At 424 the helipad sends a message to the VTOL indicating that the VTOL has been secured to the helipad. The method then proceeds to 426.

Referring now to FIG. 5B, At 426 the helipad moves the helipad and the VTOL to a destination area of the heliport system. In one embodiment the destination area can be the cargo loading/unloading area 16. In one embodiment the destination area can be the maintenance area 18. In one embodiment the destination area can be any other area of the heliport system 10. Alternatively, this step can be skipped if the destination area for the pad is the TO/L area. The method then proceeds to 428.

At 428 the helipad is secured to the destination area. The method then proceeds to 430.

At 430 the helipad sends a message to the VTOL saying the helipad is secured to the destination area. The method then proceeds to 432.

At 432 the helipad initiates fueling of the VTOL. In one embodiment the fueling is initiated by the VTOL fueling mechanism 117 and the VTOL fueling module 126. The method then proceeds to 434.

At 434 the helipad sends a message to the VTOL indicating the fueling status of the VTOL. The method then proceeds to 436.

At 436 the desired action of the destination area can be performed. In one embodiment the desired action is the loading or unloading of passengers from the VTOL. In one embodiment the desired action is the loading or unloading of cargo from the VTOL. In one embodiment the desired action is performing maintenance to the VTOL. The method then proceeds to 438.

At 438 the VTOL sends a message to the controller indicating the fueling status of the VTOL. The method then proceeds to 440.

At 440 the controller sends a message to the helipad to complete fueling of the VTOL. The method then proceeds to 442.

At 442 the helipad sends a message to the controller that fueling of the VTOL is complete. The method then proceeds to 444.

At 444 the controller sends a message to the helipad to move the helipad and VTOL to the TO/L area. The method then proceeds to 446.

At 446 the helipad is released from the destination area. The method then proceeds to 448.

At 448 the helipad moves to the TO/L area. The method then proceeds to 450.

At 450 the helipad sends a message to the controller saying that the helipad and VTOL have been moved to the TO/L area. The method then proceeds to 452.

At 452 the controller sends a message to the helipad saying to unsecure the VTOL from the helipad. The method then proceeds to 454.

At 454 the helipad sends a message to the controller saying that the VTOL has been unsecured from the helipad. The method then proceeds to 456.

At 456 the controller sends a message to the VTOL clearing the VTOL for take-off. The method then proceeds to 458.

At 458 the VTOL takes-off from the helipad.

The present invention achieves at least the following advantages:
1. assist in the logistics of heliport management and control;
2. increasing the number of aircraft that can be processed through the heliport;
3. aircraft movement does not require the use of aircraft power, minimizing wear on the aircraft;
4. reduce unnecessary replication of maintenance components at each docking area in the heliport; and
5. automated services minimize human involvement in the period between flights.

While the disclosure has described a number of embodiments, it is not thus limited and is susceptible to various changes and modifications without departing from the spirit thereof. Persons skilled in the art will understand that this concept is susceptible to various changes and modifications, and can be implemented or adapted readily to other types of environments. Further, the individual elements of the claims are not well-understood, routine, or conventional. Instead, the claims are directed to the unconventional inventive concept described in the specification.

What is claimed is:

1. A heliport docking system, comprising:
   a mobile helipad, including:
      a VTOL fueling mechanism configured to provide a VTOL with an energy source, and
      a VTOL maintenance device configured to detect and obtain needed maintenance data from the VTOL aircraft;
   a helipad controller operably coupled to the mobile helipad, including:
      a helipad routing module adapted to determine a destination of the helipad and for the helipad, a route to the destination, and control transport of the mobile helipad along the route,
      a VTOL maintenance module adapted to receive the maintenance data from the VTOL maintenance device and communicate the needed maintenance data to cause the helipad routing module to route the mobile helipad to a maintenance area, and
      a VTOL fueling module configured to control the amount of fuel delivered to the VTOL aircraft by the fueling mechanism; and
   a transport mechanism communicatively coupled to the mobile helipad and the helipad routing module in the helipad controller and configured to transport the helipad and the VTOL to the destination along the route.

2. The heliport docking system of claim 1, the helipad further including:
   a VTOL sensor configured to detect the presence of the VTOL proximate the helipad,
   a VTOL securing device configured to secure the VTOL to the helipad, and
   an obstacle sensor configured to detect objects proximate the helipad.

3. The heliport docking system of claim 2, the helipad controller further including:
   a VTOL securing module adapted to control the VTOL securing device.

4. A method for operating a heliport system, comprising:
   receiving a request from an aircraft to land at a heliport;
   requesting transport of a mobile helipad to a landing area to receive the aircraft;
   securing the aircraft to the mobile helipad after landing; and
   transporting the mobile helipad with the secured aircraft to a destination area;
   fueling the aircraft during transport;
   detecting and obtaining maintenance data from the aircraft during transport;
   if aircraft maintenance is required, routing the mobile helipad to a maintenance area; and
   unloading the aircraft upon arrival at the destination area.

5. The method of claim 4, wherein the aircraft is a VTOL.

6. The method of claim 4, wherein the aircraft is a rotorcraft.

7. The method of claim 4, wherein the aircraft is an airplane.

8. The method of claim 4, wherein the aircraft is a drone.

9. The method of claim 4, wherein the helipad is transported along a chain track disposed in the ground.

10. The method of claim 4, wherein the helipad is transported via towing.

11. The method of claim 4, wherein the helipad is transported via self-propulsion of the helipad.

12. The method of claim 4, wherein the fueling of the aircraft includes supplying the aircraft with fuel to power a combustion engine of the aircraft.

13. The method of claim 4, wherein the fueling of the aircraft includes supplying the aircraft with electricity to power an electric engine of the aircraft via a static electrical connection between the helipad and the aircraft.

14. The method of claim 4, wherein the fueling of the aircraft includes supplying the aircraft with electricity to power an electric engine of the aircraft via an inductive charge from the helipad to the aircraft.

15. The method of claim 4, further comprising scanning for obstacles while transporting the helipad from the landing area to the destination area via a sensor on the helipad.

16. A method for automated helipad transport, comprising:
    securing an aircraft to a helipad via a securing device;
    detecting and obtaining maintenance data from the aircraft during transport;
    if aircraft maintenance is required, routing the mobile helipad to a maintenance area;
    determining a destination area for the helipad based upon the contents of the aircraft;
    determining a route for the helipad to travel to the destination area;
    autonomously transporting the helipad along the route to the destination area;
    sensing an obstacle blocking the route via a sensor;
    avoiding the obstacle; and
    continuing transport of the helipad along the route to the destination area.

17. The method of claim 16, wherein the securing device is a mechanical, electrical, or magnetic restraint.

18. The method of claim 17, wherein the securing device is pressure-sensitive.

19. The method of claim 16, further comprising identifying the dimensions and weight of the aircraft.

20. The method of claim 16, wherein the sensor can emit and detect ultrasonic, acoustic, LIDAR, or RADAR signals.

* * * * *